(12) United States Patent
Cirino (10) Patent No.: US 10,564,063 B2
(45) Date of Patent: Feb. 18, 2020

(54) SYSTEM AND METHOD FOR DETECTING FAILURES IN INSULATING GLASS UNITS

(71) Applicant: Associated Materials, LLC, Cuyahoga Falls, OH (US)

(72) Inventor: Christian Aaron Cirino, Ravenna, OH (US)

(73) Assignee: Associated Materials, LLC, Cuyahoga Falls, OH (US)

( * ) Notice: Subject to any disclaimer, the term of this patent is extended or adjusted under 35 U.S.C. 154(b) by 148 days.

(21) Appl. No.: 15/801,603

(22) Filed: Nov. 2, 2017

(65) Prior Publication Data
US 2018/0128708 A1    May 10, 2018

Related U.S. Application Data

(60) Provisional application No. 62/419,721, filed on Nov. 9, 2016.

(51) Int. Cl.
*G01M 3/32*      (2006.01)
*E06B 3/677*     (2006.01)
(Continued)

(52) U.S. Cl.
CPC ......... *G01M 3/3272* (2013.01); *C03C 27/06* (2013.01); *E06B 3/677* (2013.01); *E06B 3/6775* (2013.01); *G01M 3/363* (2013.01)

(58) Field of Classification Search
CPC .......... G01M 3/00; G01M 3/02; G01M 3/026; G01M 3/32; G01M 3/3236; G01M 3/3272
See application file for complete search history.

(56) References Cited

U.S. PATENT DOCUMENTS

| 4,886,095 A |   | 12/1989 | Lisec |
|---|---|---|---|
| 5,287,726 A | * | 2/1994 | Burritt .................. G01M 3/02 134/21 |

(Continued)

FOREIGN PATENT DOCUMENTS

| CN | 203285275 U | 11/2013 |
|---|---|---|
| WO | WO 99/22106 | 5/1999 |

*Primary Examiner* — Nathaniel J Kolb
(74) *Attorney, Agent, or Firm* — Knobbe, Martens, Olson & Bear LLP (57) ABSTRACT

A system for detecting leaks in a sealed insulating glass unit (IGU) includes a pressure source, a flow path that extends between the pressure source and a distal end removably coupleable to the IGU to place the pressure source in fluid communication with an interior space of the IGU, and a pressure sensor to monitor a pressure level in the interior space. A method for testing the IGU for leaks includes applying a pressure to an interior space of the sealed IGU, monitoring the pressure in the interior space, and determining whether one or more failure conditions exists by comparing the monitored pressure to a desired pressure after a specified period of time. The IGU failure exists if the monitored pressure is less than the desired pressure (e.g., less than the desired pressure by more than a predetermined amount) after a first specified period of time, if after reaching the desired pressure the difference between the applied pressure and the desired pressure is greater than a predetermined amount after a second specified period of time, or if one or more of the glass lites breaks.

21 Claims, 6 Drawing Sheets

(51) Int. Cl.
*C03C 27/06* (2006.01)
*G01M 3/36* (2006.01)

(56) References Cited

U.S. PATENT DOCUMENTS

| | | |
|---|---|---|
| 5,643,644 A | 7/1997 | Demars |
| 5,855,638 A | 1/1999 | Demars |
| 5,957,169 A | 9/1999 | Trpkovski |
| 6,216,751 B1 | 4/2001 | Trpkovski |
| 6,916,392 B2 | 7/2005 | Trpkovski et al. |
| 7,184,146 B2 | 2/2007 | Trpkovski |
| 2008/0302059 A1* | 12/2008 | Du Plessis ............ E06B 3/6775 52/786.11 |
| 2014/0150533 A1* | 6/2014 | Ono ........................ G01M 3/04 73/46 |
| 2014/0318669 A1* | 10/2014 | McHugh ................. E06B 3/677 141/8 |
| 2016/0060158 A1 | 3/2016 | Naito et al. |
| 2017/0328121 A1* | 11/2017 | Purdy ....................... E06B 9/24 |

* cited by examiner

SYSTEM AND METHOD FOR DETECTING FAILURES IN INSULATING GLASS UNITS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Insulating glass units are used in many industries to increase the thermal performance of items using glass (e.g., residential windows/doors/skylights, curtain walls, refrigerators, transportation vehicles, etc.). Most Insulating glass units include glass lites separated by a spacer along its perimeter, such that an air space is created between the glass lites, and most insulating glass units are hermetically sealed to maintain the airspace dry. A single insulating glass unit may contain multiple airspaces by sandwiching more layers of glass and spacers together.

The heat transfer properties (e.g., thermal performance) of an IGU may be compromised if there is a failure in the seal (e.g., a failure of the sealant to resist the ingress of moisture into the interior of the IGU). Additionally, a failure in the seal can lead to visual obstruction due to condensation/fogging on the interior of the IGU and the detrimental effects to the glass surface and/or coating from such repeated condensation effects. A failure in the seal can be due to, for example, manufacturing defects, contamination, environmental influences, chemical exposure, or the like. In addition, a contributor to seal failure can be a void in the sealant path, which can be caused by a sealant application error or a mishandling of the IGU during assembly.

Another failure that may compromise the heat transfer properties (e.g., thermal performance) of the IGU is stress cracks in the glass lites (e.g., complete and irreparable breaks in the glass lites). Various causes may lead to stress cracks, such as, for example, edge defects, improper handling, thermal stress, or the like. Edge defects may include microscopic factures at the edges of the glass, which create weak points for breakage to occur. Stress cracks may go undetected for long periods of time before a visible failure is observed. Therefore, although an IGU may be able to resist manufacturing, shipping, and installation processes, the IGU may fail from environmental stresses imposed on them by atmospheric and thermal influences after installation.

Various types of systems that use mirrors, cameras, and scanners have been used to inspect insulating glass units for manufacturing defects before they leave the manufacturer. In addition, human inspection is often performed to determine if there are any sealant defects or stress cracks in the glass lites, or if there is any edge damage in the unit that may lead to future stress cracks. However, the effectiveness of these inspection techniques is low, allowing defects to go undetected.

SUMMARY

There is a need for an improved system and method for inspection of insulating glass units that do not suffer from the deficiencies of existing systems and methods described above. The present application discloses systems and methods for detecting leaks in an insulating glass unit, such as, for example, leaks due to a failure in the hermetic seal of a sealed insulating glass unit.

According to an aspect of the present application, a method for inspecting a sealed insulating glass unit ("IGU") includes applying a pressure to an interior of the sealed IGU and monitoring the pressure in the interior of the IGU. The method further includes determining whether an IGU failure exists by comparing the monitored pressure to a desired pressure after a specified period of time. The IGU failure exists if the monitored pressure is less than the desired pressure (e.g., less than the desired pressure by more than a predetermined amount).

In accordance with another aspect of the present application, a method for inspecting a sealed insulating glass unit is provided. The method comprises applying a pressure to an interior space between a pair of glass lites of the sealed IGU and monitoring the pressure in the interior space of the IGU. The method also comprises comparing the monitored pressure to a desired pressure after a first specified duration of time to determine if a failure condition exists, wherein the failure condition exists if the monitored pressure is less than the desired pressure.

According to another aspect of the present application, a system for detecting leaks in an IGU includes a pressure pump, a pressure line, and a pressure sensor. The pressure line is connected at one end to the pressure pump and at the other end to a connection port of a sealed IGU such that the pressure pump is in fluid communication with an interior of the IGU (e.g., in fluid communication with the open space in between the lites of glass). The pressure sensor is disposed in the pressure line and is configured to monitor a pressure being applied by the pressure pump and the pressure in the in the interior of the IGU (e.g., in the open space between the lites of glass). An exemplary IGU includes at least two lites of glass, at least one spacer separating the two lites to define an open space between the two lites, and a connection port that is in fluid communication with said space. The connection port is configured to removably attach to the system.

In accordance with another aspect of the present application, a system for inspecting a sealed insulating glass unit is provided. The system comprises a pressure test assembly releasably coupleable to a sealed insulating glass unit. The pressure test assembly comprises a pressure source, a flow path extending between a proximal end in communication with the pressure source and a distal end releasably coupleable to the IGU to place the pressure source in fluid communication with an interior space of the IGU defined between a pair of glass lites of the IGU, and a pressure sensor disposed in communication with the interior space of the IGU and configured to measure a pressure in the interior of the IGU. The pressure test assembly is operable to apply a pressure to the interior space of the IGU to determine the existence of one or more failure conditions in the IGU.

In accordance with another aspect of the present application, an insulating glass unit is provided. The insulating glass unit comprises at least two lites of glass, at least one spacer that separates the two lites of glass to define an interior space between the two lites of glass, and a port that is in fluid communication with the interior space. The port configured to removably attach to a system for inspecting the insulating glass unit.

DETAILED DESCRIPTION

The general inventive concepts are described herein with occasional reference to one or more embodiments. These general inventive concepts, however, may be embodied in different forms and should not be construed as limited to the embodiments set forth herein. Rather, these embodiments are provided so that this disclosure will be thorough and complete, and will fully convey the scope of the general inventive concepts to those skilled in the art. Indeed, the invention is broader than and unlimited by the exemplary embodiments, and the terms used in the claims have their full ordinary meaning.

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device.

"Fluid communication" indicates a connection between devices in which a fluid may travel from one device to another device. Two devices are in fluid communication if a fluid from one device is received by the other device, regardless of whether the fluid is modified by, or passes through, some other device. That is, two or more devices separated by any number of intermediate devices are in fluid communication if a fluid from one device is received by the other device, even though the fluid is modified by, or passes through, the intermediate devices.

An insulating glass unit ("IGU") generally includes two or more glass lites, in which each two glass lites are separated by a pressure or gas filled space (e.g., an unobstructed, or open, space). In order to obtain the pressure or gas filled space, the glass lites may be separated by a spacer, and a sealant may be disposed between the spacer and the glass lites to inhibit (e.g., prohibit) the ingress of moisture into the IGU. The pressure or gas filled space reduces heat transfer across the IGU. The gas used to fill the space may include, for example, air, argon, krypton, any other noble gas, etc.

Figure 1A:
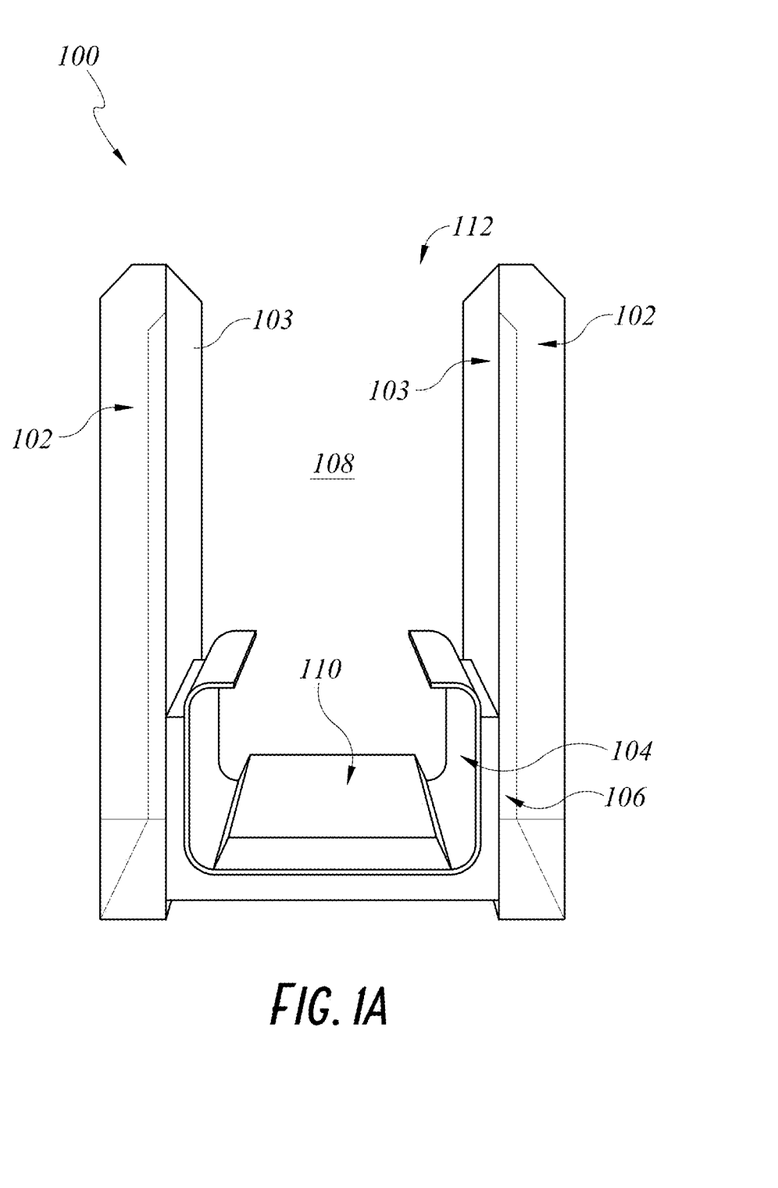
FIG. 1A illustrates a schematic view of a section of an insulating glass unit.

Referring to FIG. 1A, an IGU 100 is shown and includes a pair of glass lites 102. A spacer 104 is disposed between and operably coupled to the pair of glass lites 102, so as to define an open space 108 (e.g., a gas-filled space, unobstructed space) between the glass lites 102. A sealant 106 is disposed between the spacer 104 and an inner surface 103 of the glass lites 102 to inhibit (e.g., prohibit) the ingress of moisture into the IGU 100 (e.g., into the open space 108). The IGU 100 may optionally be assembled such that an air space 108 exists between the glass lites 102.

Figure 1B:
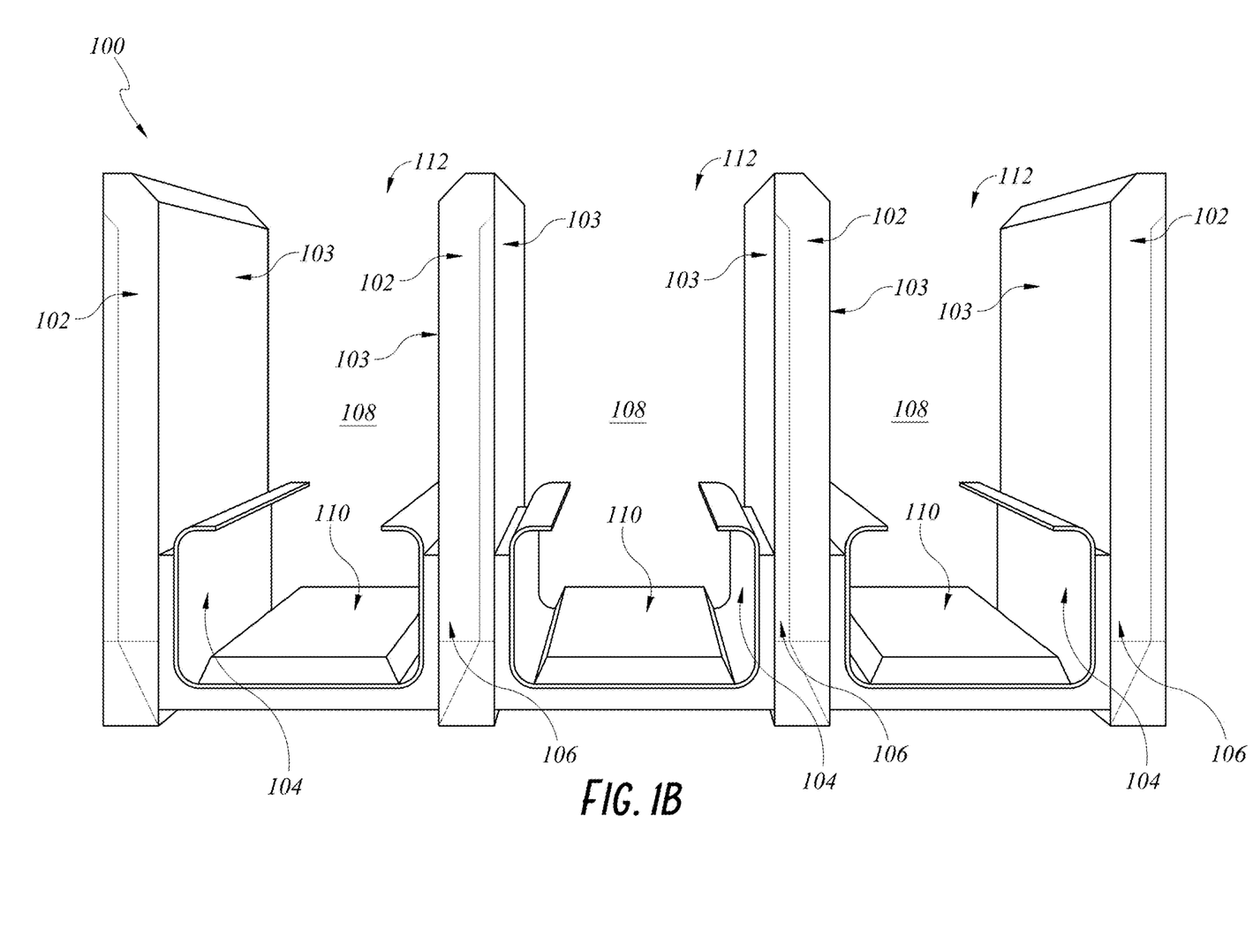
FIG. 1B illustrates a schematic view of a section of another insulating glass unit.

Referring to FIG. 1B, an IGU 100' may optionally include more than two glass lites 102, such as, for example, three glass lites 102, four glass lites 102, etc. A spacer 104 and a sealant 106 may be disposed between each two glass lites 102, in a similar manner as described above with respect to IGU 100, such that an open space 108 (e.g., gas-filled space, such as air space) exists between each two glass lites 102. Further, the glass lites 102 may optionally be coupled to the spacers 104 by any suitable mechanism, such as, for example, an adhesive, welding, soldering, or the like. Optionally, the sealant 106 can couple (e.g., structurally couple) the glass lites 102 to the spacers 104. Examples of adhesives that may optionally be used to couple the glass lites 102 to the spacers 104, and that can provide the sealant 106, include organic adhesive sealants (e.g., Butyl rubber), inorganic adhesive sealants (e.g., silicone), or hybrids utilizing both organic and inorganic adhesive sealants.

The glass lites 102 may be precut to size, cut from stock using specialty glass cutting equipment, or may be formed by any other suitable method. In certain embodiments, the glass lites 102 may undergo processes such as heat treatment, edge seaming, or edge deletion (i.e., coating removal along sealing edges of the glass lite). Prior to assembling the glass lites 102 to the spacer 104, the glass lites 102 may be cleaned to provide for a more clear line of vision through the glass lites 102 (e.g., improved transparency). The glass lites 102 may be cleaned with specialized equipment that washes and rinses the glass with water, and then the glass lites 102 may be thoroughly dried.

The spacer 104 may take several different forms, such as, for example, roll formed metals in various shape profiles, extruded metals, extruded thermal plastics, flexible materials (e.g., foam rubber/silicone variants, etc.), or the like. The spacer 104 separates the glass lites 102 to create a distinct space 108 (e.g., airspace, gas-filled space) between the glass lites 102.

The IGU 100, 100' optionally includes a thermal break (e.g., a sealant 106 having thermal resistance properties that allows the sealant to act as an insulator and impede conduction, or a spacer 104 made of material having properties that impede conductance) to reduce or prohibit the flow of thermal energy through the IGU 100. The IGU 100, 100' optionally includes a drying agent 110 (e.g., a molecular sieve desiccant, a silica bead desiccant, integrated desiccants, or the like) that advantageously draws moisture out of the space 108 (e.g., airspace) and inhibits (e.g., prohibits) moisture that may have been trapped in the space 108 during the assembly process of the IGU 100, 100' from precipitating onto the internal surface 103 of the glass lites 102 and thereby clouding the view through the IGU 100, 100'.

After the IGU 100, 100' is assembled, the IGU 100, 100' is hermetically sealed, such that there is no passage of air, oxygen, or other gases into an interior 112 of the IGU 100, 100'. The sealant 106 acts as a barrier to keep ambient environment conditions from entering the IGU 100. The sealant 106 may optionally be a one-part sealant that also serves as the adhesive that structurally holds the IGU 100, 100' together. In one alternative, the sealant 106 may optionally include multiple parts, each of which has different characteristics and fulfills different duties. For example, a sealant 106 may optionally include a first part that has superior moisture barrier characteristics and a second part that has superior adhesive characteristics. In this example, the first part of the sealant 106 may provide the main seal for the IGU 100, 100', and the second part of the sealant 106 may provide a secondary seal that lends structural integrity to (e.g., structurally hold together) the IGU 100, 100'.

Systems and methods for detecting flaws in an IGU, such as the IGU 100, 100', are described in this application. In certain embodiments, the systems and methods include employing a pressure to test for flaws in the hermetic seal of an IGU. For example, the pressure may be applied through a port in the IGU, such as, for example, through a port in the spacer of an IGU. A seal failure is detected if, for example, the IGU does not reach the applied pressure within a specified duration of time. In addition, a seal failure is detected if, for example, after the IGU reaches the applied pressure, the IGU fails to maintain the applied pressure for a specified duration of time. The applied pressure in the systems and methods disclosed herein can optionally be a negative pressure (e.g., a vacuum). Alternatively, the applied pressure in the systems and methods described herein can be a positive pressure. The applied pressure and specified duration of time may optionally be selected based on the order of pressure fluctuations that the IGU will experience in operation during its lifetime (e.g., via thermal expansion/contraction and atmospheric pressure fluctuations). In addition, the applied pressure and the specified duration of time may optionally be based on the properties of the IGU (e.g., size, glass thickness, aspect ratio, glass strength, heated glass, annealed glass, heat strengthening/tempering, etc.). Moreover, the applied pressure and the specified duration of time may optionally be selected such that the glass should not break or implode during testing. Another type of failure of the IGU is detected if the glass lites break or implode prior to the end of the specified duration of time that the seal of the IGU is being tested.

Figure 2:
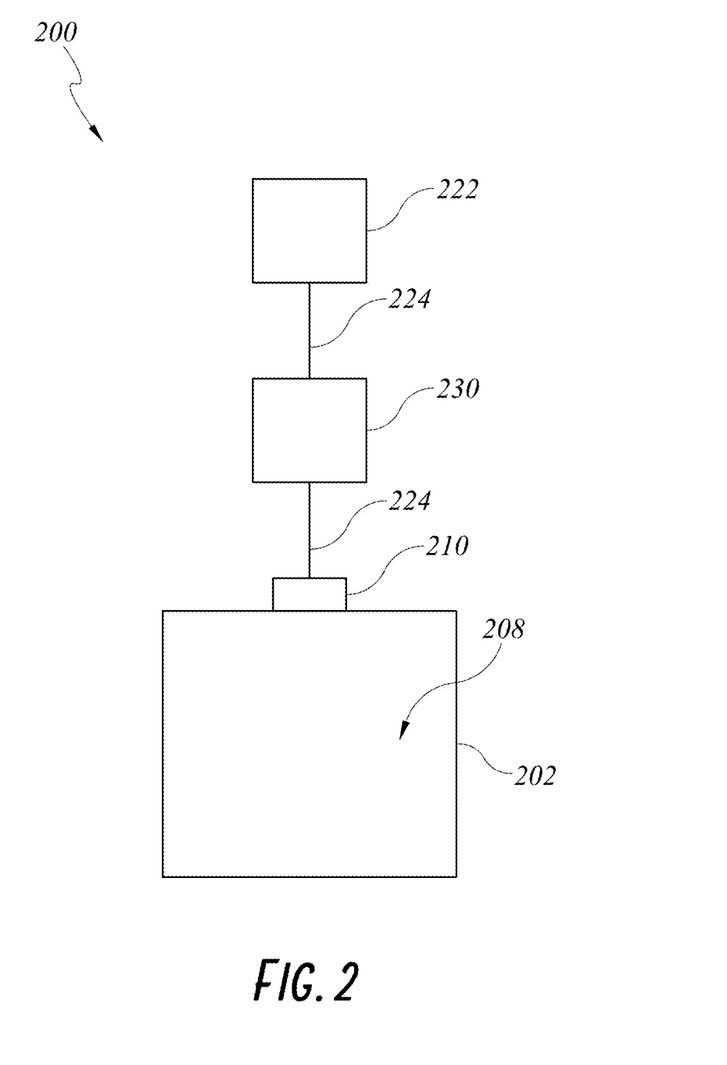
FIG. 2 schematically illustrates a system for detecting a failure in an insulating glass unit according to an embodiment of the present application.

FIG. 2 schematically illustrates a system 200 for detecting a failure in a sealed IGU 202. The system 200 can be a standalone machine, or incorporated into other systems (e.g., gas filling systems) that include additional components. The system 200 can optionally include a pressure source (e.g., pressure pump) 222 in fluid communication via one or more conduits 224 (e.g., pressure lines) with a port 210 of the IGU 202. The system 200 can optionally include a pressure sensor 230 disposed between the pressure source 222 and the IGU 202 The system 200 may be used to detect a seal failure in any IGU, such as, for example, the IGU 100, 100' described in the present application.

The one or more conduits (e.g., pressure lines) 224 of the system 200 may attach to the connection port 210 of the IGU 202 by any suitable mechanism that allows the pressure source (e.g., pump) 222 to be in fluid communication with the interior (e.g., the space 208) of the IGU 202. The connection port 210 may optionally be located on the spacer 104. For example, the spacer 104 may optionally be a roll-formed U-shaped spacer, and the connection port 210 may be a vent hole on the U-shaped spacer. In this example, the vent hole may be sealed after the conduit or pressure line 224 is detached from the connection port 210. In an alternative, the spacer 104 may optionally be made of flexible material (e.g., foam rubber/silicone variants, etc.), and a lance (that is in fluid communication with the pressure line 224) may be used to pierce the flexible spacer, which will close (e.g., like a septic seal) after the lance is removed from the flexible spacer. In yet another example, the connection port 210 may be fabricated by a penetration in the spacer 204 or glass lites 202, and the fabricated passage may be sealed after the pressure line 224 is removed from the connection port 210.

The pressure source 222 of the system 200 can optionally be a pump, such as any suitable pressure pump that is able to apply positive and/or a negative pressure to the interior (e.g., the space 208) of an IGU 202. For example, the pressure source 222 may be a pump, such as a vacuum pump, an air compressor, a pressurized fill gas canister, or the like. The interior (e.g., space 208) of the IGU 202 can be similar to the space 108 of IGU 100, 100' described above. Pressure can optionally be cycled on and off by the system 200 to provide stress conditioning of the IGU 202 over a predetermined number of cycles (e.g., 10 cycles, 20 cycles, 25 cycles, 50 cycles, etc.) to check the strength of the hermetic seal. Such cycling of the pressure can optionally be performed during the first test phase (further described below).

The pressure sensor 230 may be any suitable pressure sensor that is able to detect the pressure being applied by the pressure source 222 and/or the pressure in the interior (e.g., space 108) of the IGU 202. That is, the pressure sensor 230 is disposed in the system 200 such that the pressure sensor is in fluid communication with the IGU 202. The pressure sensor 230 may optionally communicate directly with the IGU 202 by attaching the pressure sensor 230 to a separate port in the IGU (rather than communication port 210) or by placing the pressure sensor inline of the pressure pump 222 and sharing communication port 210. In certain embodiments, the pressure sensor 230 is able to detect positive and negative pressures. The pressure sensor 230 can optionally include, but is not limited to, mechanical sensors, electro-mechanical sensors (e.g., analog differential sensors, piezo-electric sensors, flow sensors, etc.), or the like.

During operation of the system 200, an IGU 202 is placed in fluid communication with the pressure source (e.g. pump) 222, such as by connecting the conduit or pressure line 224 to the port 210. The pressure source 222 is operated to apply a pressure to the interior (e.g., space 208) of the IGU 202 until a desired pressure is reached in the IGU 202. The pressure applied by the pressure source 222 is optionally measured by the pressure sensor 230 to determine if and when the desired pressure is reached. The desired pressure may depend on the type of IGU 202 (e.g., the type of insulating unit may be determined by the height, width, airspace width, glass thickness, etc.). In addition, the desired pressure may be determined based on specifications from an IGU that is used in residential buildings. Optionally, the desired pressure may also be experimentally determined on the order of pressure fluctuations that an IGU will experience during its lifetime while in use (e.g., via atmospheric pressure fluctuations, thermal expansion and contraction, etc.). Exemplary applied pressures may be between about −40 KPa and about 40 KPa. In another example, the applied pressure may be between about −5 KPa and about 5 KPa.

The pressure applied by the pressure source 222 is monitored by the pressure sensor 230 to determine whether or not the IGU 202 has a failure in the hermetic seal. If the monitored pressure in the IGU 202 does not reach a desired target pressure within a first specified duration of time, the IGU may be determined to have a seal failure (the "first test phase"). The evaluation of whether the IGU 202 meets or fails the first test phase can be performed manually (e.g., a user reading analog pressure gauges) or by an electronic controller, such as the controller 308 described below in connection with FIG. 3. The first specified duration of time may optionally be between about 1 second and about 600 seconds, such as between about 1 second and about 300 seconds, such as between about 1 second and about 120 seconds, such as between about 2 seconds and about 600 seconds, such as between about 2 seconds and about 300 seconds, such as between about 2 seconds and about 120 seconds, such as between about 60 seconds and about 600 seconds, such as between about 60 seconds and 300 seconds, such as between about 60 seconds and about 120 seconds, such as between about 120 seconds and 600 seconds, such as between about 60 seconds and about 300 seconds. The first specified period of time may be determined such that a sufficient amount of time has passed to determine whether small leaks exist in the IGU 202, but an excess amount of time has not passed that would inhibit production flow.

Once the desired pressure is reached in the interior of the IGU 202, if the difference between the monitored pressure and the desired pressure is greater than a predetermined amount equal to a failure point after a second specified duration of time, the IGU may be determined to have a failure in the hermetic seal (the "second test phase"). The evaluation of whether the IGU 202 meets or fails the second test phase can be performed manually (e.g., a user reading analog pressure gauges) or by an electronic controller, such as the controller 308 described below in connection with FIG. 3. The failure point may optionally be between about −20 KPa and about 20 KPa, such as between about −2 KPa and about 2 KPa, such as between about −1 KPa and about 1 KPa. The second specified duration of time may optionally be between about 0 seconds and about 300 seconds, such as between about 0 seconds and about 120 seconds, such as between about 0.5 seconds and about 120 seconds, such as between about 1 second and 120 seconds, such as between about 0.5 seconds and about 300 seconds, such as between about 1 second and about 300 seconds. The second specified period of time may be determined such that a sufficient amount of time has passed to determine whether small leaks exist in the IGU 202, but an excess amount of time has not passed that would inhibit production flow. If the first and second durations of time expire, and a failure is not detected in the hermetic seal, the IGU 202 may be determined to not have a failure in the hermetic seal.

In certain situations, the glass lites may break prior the expiration of the first and/or second specified durations of time. In these situations, the IGU 202 may be determined to have had a stress crack in the glass lites. Therefore, the system 200 can be used to test whether the IGU 202 has a failure due to stress cracks. Such testing with the system 200 can be independent of the system 200 being used to determine if other failure conditions exists (e.g., if there is a defect in the hermetic seal). If the first and second specified periods of time pass, and a failure due to pressure fluctuations (as described above) did not occur, and the glass lites did not break, the IGU 202 may be determined to not have a failure.

The system 200 may be used to test the IGU 202 for a failure in the hermetic seal at various instances during the assembly of the IGU 202. That is, the system 200 may be disposed at various locations during the assembly of an IGU 202. The system 200 may optionally be placed as early as possible during the assembly process because, the earlier a failure is detected during the assembly process, the less time and resources that are used on a failed IGU. In circumstances in which the IGU 202 has already been assembled, the system 200 may be used separate from the assembly process to test the IGU for any failures to the hermetic seal and to fill the IGU (e.g., fill the inner space of the IGU) with a gas.

Figure 3:
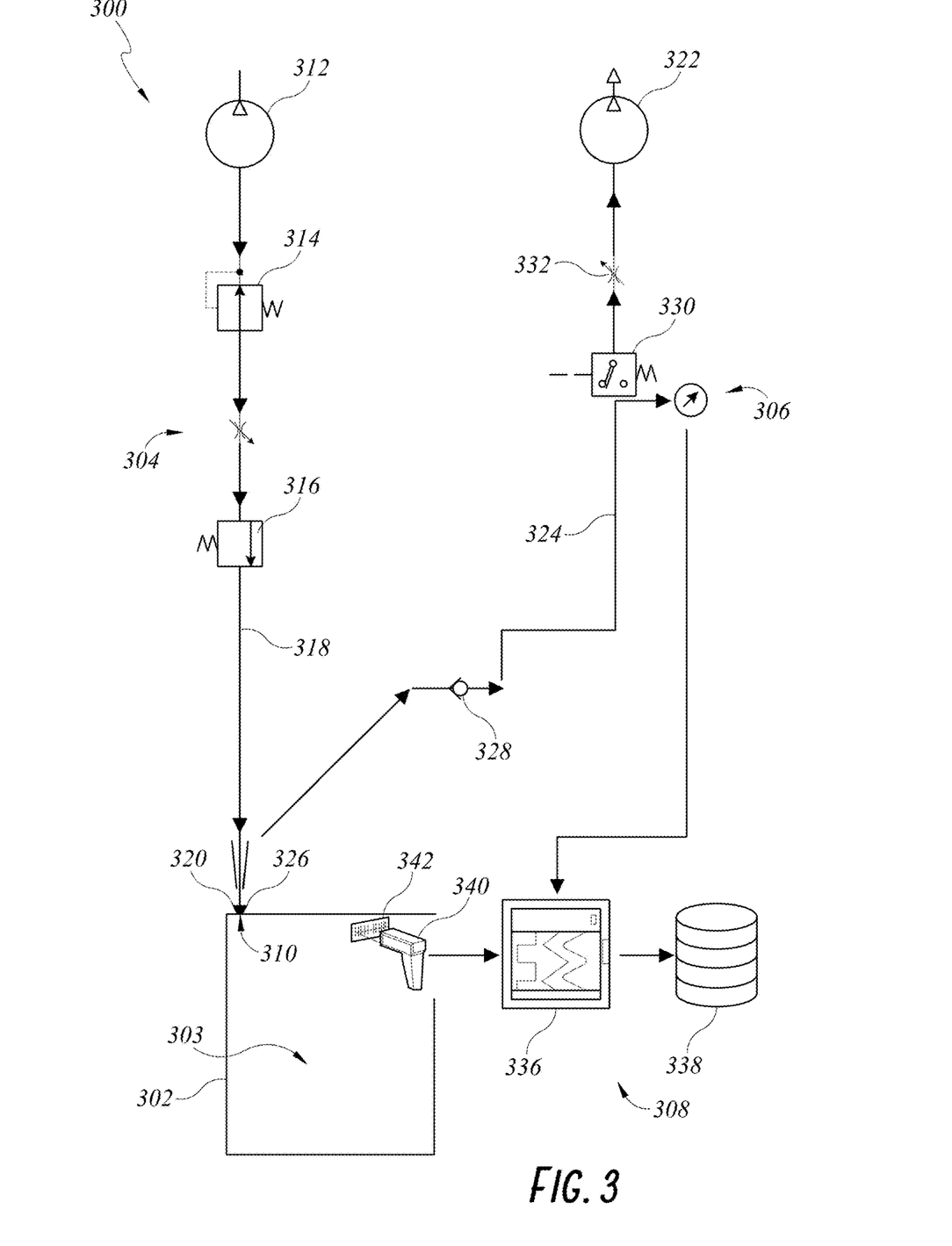
FIG. 3 schematically illustrates another system for detecting a failure in an insulating glass unit according to an embodiment of the present application.

FIG. 3 illustrates another system 300 for detecting leaks in a sealed IGU 302. The system 300 includes a gas portion 304, a pressure portion 306, and a control portion 308. The gas portion 304 is used to fill the IGU with a gas, such as, for example, any gas described herein, as well as any other suitable gas that is generally used in an IGU. The pressure portion 306 is used to apply a negative or positive pressure to an interior 303 of the IGU 302 in order to test the IGU for a seal failure. The interior 303 of the IGU 302 can be similar to the space 108 described previously. The control portion 308 is used to control the gas portion 304 and/or the pressure portion 306. The IGU 302 can include a port 310 (e.g., connection port) for connecting the gas portion 304 and/or the pressure portion 306 to the IGU 302. The port 310 can be similar to the port 210 described above.

In the illustrated embodiment, both the gas portion 304 and the pressure portion 306 are connected to the port 310. That is, a gas line 318 of the gas portion 304 and a pressure line 324 of the pressure portion 306 are connected to the port 310 (e.g., via a single connector). However, only one of the gas portion 304 and pressure portion 306 may be in operation at a time. In an alternative embodiment, the IGU 302 may have multiple ports 310, and the gas portion 304 and the pressure portion 306 may be connected to separate ports 310. In yet another embodiment, the IGU 302 may have a single port, and only one of the gas portion 304 and the pressure portion 306 may separately connect to the port at a time. The gas line 318 and/or the pressure line 324 may be attached to the port 310 by any suitable mechanism that allows the gas source (e.g., pump) 312 and/or the pressure source (e.g., pump) 322 to be in fluid communication with the interior of the IGU 302. For example, the gas line and pressure line may be attached to the port 310 any mechanism described herein with respect to IGU 202 (FIG. 2).

As shown in FIG. 3, the gas portion 304 of the system 300 optionally includes a gas source (e.g., pump) 312, a gas line 318 that runs from the gas source 312 to a distal end (e.g., an outlet) 320, a pressure regulator 314 disposed between the gas source 312 and the outlet 320 (e.g., disposed on the gas line 318), and a shut-off valve 316 between the gas source 312 and the outlet 320 (e.g., disposed on the gas line 318). The outlet 320 of the gas line 318 can releasably connect to the port 310 of the IGU 302. When the outlet 320 of the gas line 318 is connected to the port 310 of the IGU 302, the gas source (e.g., pump) 312 is in fluid communication with the interior 303 of the IGU 302. The gas source 312 can be any suitable device that is able to provide a gas through the gas line 318 and into the interior 303 of the IGU 302. For example the gas source 312 may be a pump, a bulk tank, a portable cylinder, or a compressor system.

The pressure regulator 314 can control the pressure of the gas supplied by the gas source 312 and cut-off the flow of gas at a certain pressure. Any suitable pressure regulator may be used that is able to control the pressure being supplied by the gas source 312 and cut-off the flow of pressure at a certain pressure. For example, the pressure regulator 314 may be a digital regulator; a pressure transducer or analog regulator that uses a piston, diaphragm, or any other suitable mechanism for reducing pressure; or any other suitable regulator.

The shut-off valve 316 provides a user with the ability to shut-off the flow of gas from the gas source 312 to the IGU 302. Any suitable shut-off valve may be used that is able to shut off the flow of gas from the gas source 312 to the IGU 302. For example, the shut-off valve may take any suitable form, such as, pneumatically actuated valves, mechanically actuated valves, electrically actuated solenoid valves, or the like.

As shown in FIG. 3, the pressure portion 306 includes a pressure source (e.g., pump) 322, a pressure line 324 that runs from a distal end (e.g., an opening) 326 to the pressure source (e.g., pump) 322, a valve 328 disposed between the pressure source 322 and the distal end 326 (e.g., disposed on the pressure line 324), a pressure sensor 330 disposed between the pressure source 322 and the distal end 326 (e.g., disposed on the pressure line 324), and a flow control valve 332 disposed between the pressure source 322 and the distal end 326 (e.g., disposed on the pressure line 324). The distal end (e.g., opening) 326 of the pressure line 324 can releasably connect to the port 310 of the IGU 302. When the distal end 326 of the pressure line 324 is connected to the port 310 of the IGU 302, the pressure source 322 is in fluid communication with the interior 303 of the IGU 302. Any suitable pressure source 322 may be used, such as, for example, any pressure pump described herein with reference to system 200 (FIG. 2). The valve 328 allows the flow of fluid from the distal end (e.g., opening) 326 to the pressure source 322 and prohibits flow from the pressure line 324 out of the distal end 326. The pressure sensor 330 is used to measure the pressure inside the IGU 302 (e.g., in the interior 303) The pressure sensor can optionally be placed near the port 310 of the IGU 302. Any suitable pressure sensor 330 may be used, such as, for example, any pressure sensor described herein with reference to system 200. The flow control valve 332 can regulate the pressure applied to the IGU 302. That is, the flow control valve 332 prohibits the pressure source 322 from applying a pressure in the IGU 302 that exceeds or goes below a desired pressure. The flow control valve 332 can receive pressure measurements from the pressure sensor 330 and can control the pressure based on the received pressure measurements.

As shown in FIG. 3, the control portion 308 can include a microprocessor 336 that is in circuit communication with the pressure sensor 330 and the flow control valve 332 of the pressure portion 306. The microprocessor 336 can identify a desired pressure for the IGU 302 (i.e., the pressure differential set point for the IGU 302). The microprocessor 336 may identify the desired pressure for the IGU 302 in a variety of ways. For example, the microprocessor 336 can be is in circuit communication with a user interface (not shown), a user can input the desired pressure into the user interface, and the user interface communicates the desired pressure to the microprocessor 336. In other variation, the control portion 308 can optionally include a database 338 that contains information regarding various types of IGUs 302. For example, the database 338 can include information on one or more of height, width, inner space width (e.g., airspace width between lites), glass thickness, etc. of the IGU 302. Optionally, the database 338 can include information on the desired pressure that correlates with the specifications of the IGU, and the microprocessor 336 can obtain (e.g., from the database 338, from a memory separate from the database 338) the desired pressures that correlate with each of the various types of IGUs 302 by communicating with the database 338. In these embodiments, the type of IGU 302 is communicated to the microprocessor 336, as discussed further below, and the microprocessor 336 consults with the database 338 to determine the desired pressure. Subsequently, the microprocessor 336 optionally communicates the desired pressure to the flow control valve 332, which controls the pressure being applied to the IGU 302. Additionally or alternatively, the microprocessor 336 can communicate the desired pressure to the pressure source 322.

The type of IGU 302 may be communicated to the microprocessor 336 in various ways. For example, the microprocessor 336 may be in circuit communication with a user interface (not shown) that allows a user to communicate the type of IGU 302 to the microprocessor 336. In one alternative, the control portion 308 may communicate with a scanner 340 that is in circuit communication with the microprocessor 336, and each IGU 302 may have a barcode 342 that corresponds to a certain type of IGU 302. In this embodiment, a user scans the barcode 342 using the scanner 340, which communicates the information of the barcode 342 to the microprocessor 336, and the microprocessor 336 determines the desired pressure that corresponds to the IGU 302 (e.g., by communicating with the database 338, as discussed above).

The microprocessor 336 of the control portion 308 can optionally determine when an IGU 302 fails due to a leak in the IGU 302. A leak may be the result of a failure in the hermetic seal in the IGU 302, such as, for example, a void in the sealant path, stress cracks in the glass lites, or any other failure that causes the hermetic seal of the IGU 302 to fail. In order to detect whether or not there is a failure in the hermetic seal of the IGU 302, a desired pressure is applied to the interior (e.g., space between the lites) of the IGU 302 (e.g., by the manner described herein). A seal failure is detected if the IGU 302 does not reach the desired pressure in a specified duration of time. Additionally or alternatively, once the desired pressure is obtained in the IGU 302, a failure is detected if the IGU does not maintain the desired pressure for a specified duration of time. In order to detect whether a failure exists, the pressure sensor 330 measures the pressure in the interior of the IGU 302 (while the desired pressure is being applied and after the desired pressure is achieved), and the pressure sensor 330 communicates the measured pressure to the microprocessor 336. The microprocessor 336 may consult a database, which may be the database 338 or a different database, that contains the failure points and durations of time for a corresponding type of IGU 302, and if the measured pressure reaches the corresponding failure point within the specified duration of time, the microprocessor 336 will determine that the IGU has failed. In one alternative, a user may communicate the failure point to the microprocessor 336, which will allow the microprocessor 336 to determine if an insulating glass 302 has failed. In yet another alternative, rather than having a microprocessor 336 determine whether a unit 302 has failed, a user may calculate the failure point and durations of time, and the user can monitor a pressure gauge to determine whether the failure point has been reached within the specified duration of time.

If the failure point is not reached after a set period of time, the microprocessor 336 can determine that there is not a failure in the hermetic seal of the IGU 302. For example, the microprocessor 336 may consult a database, which may be the database 338 or a different database, that includes time requirements for each type of IGU 302 to meet in order to not be considered a failed unit. In one alternative, a user may communicate the time requirements to the microprocessor 336. The microprocessor 336 receives the pressure readings from the pressure sensor 330 and, if the pressure readings do not reach a failure point prior to the set point of time, the microprocessor 336 determines that the IGU 302 does not have a failure in the hermetic seal. In an alternative, rather than having a microprocessor 336 determine whether an IGU 302 has failed or not, a user may monitor the pressure gauge and determine when the set period of time has passed, such that the IGU 302 does not have a failure in the hermetic seal. In embodiments in which a microprocessor 336 is used, the microprocessor 336 may optionally be in circuit communication with a database, which may be the database 338 or a different database, and the microprocessor 336 may communicate information as to whether or not a failure has occurred in a particular IGU 302 to said database.

The control portion 308 may optionally control the gas portion 304 of the system 300. For example, if an IGU 302 is determined to not have a failure in the hermetic seal, the microprocessor 336 may optionally turn off the pressure portion 306 of the system 300 and turn on the gas portion 304 of the system. In this example, the microprocessor may optionally be in communication with either the gas source 312 or the shut off valve 316 of the gas portion 304, and the microprocessor 336 may control the gas portion 304 to fill the interior of the IGU 302 with a gas (e.g., air, an inert gas, etc.). The amount of gas supplied to the interior 303 of the IGU 302 may be determined by the type of IGU 302. In an alternative, once an IGU 302 is determined to not have a failure in the hermetic seal 302, a user may control the gas portion 304 to fill the IGU 302 with a desired pressure of gas.

The microprocessor 336 can optionally communicate with a database, such as the database, in a variety of ways. For example, the microprocessor 336 can communicate with the database via a wired connection (e.g., wired LAN communication). In one alternative, the microprocessor 336 can communicate with the database wirelessly (e.g., 802.11 WiFi, Bluetooth, Bluetooth Low Energy, IR communication, RF communication). In another alternative, a secure digital SD card, internal hard drive, portable hard drive, USB drive, can be used to communicate information from the database to the microprocessor.

Where a scanner 340 is used, the microprocessor 336 can optionally communicate with the scanner 340 in a wired (e.g., electrical cable, wired LAN communication) or wireless manner (e.g., 802.11 WiFi, Bluetooth, Bluetooth Low Energy, IR communication, RF communication).

Although the system 300 has been described as including three portions—the gas portion 304, the pressure portion 306, and the control portion 308—the gas portion 304 and the pressure portion 306 may also be controlled manually without the control portion 308, and the gas portion 304 and the pressure portion 306 may be controlled independently of each other. In addition, there may be a control portion or controller 308 that controls the gas portion 304, and a separate control portion 308 that controls the pressure portion 306.

The system 300 may optionally be used to test the IGU 302 for a failure in the hermetic seal at one or more (e.g., various) instances during the assembly of the IGU. That is, the pressure portion 306 of the system 300 may be disposed at various locations during the assembly of an IGU 302. It may be desirable to place the pressure portion 306 in a position that will test the IGU 302 as early as possible during assembly because, the earlier a failure is detected during the assembly process, the less time and resources that are used on a failed IGU. In addition, it may be desirable for the system 300 to optionally include a pressure portion 306 that utilizes a vacuum pump (to remove ambient atmosphere from the interior of the IGU 302) and a gas portion 304 that work in agreement with the pressure portion 306. That is, during testing of the IGU 302 by the pressure portion 306, the vacuum pump will remove ambient atmosphere to create a negative pressure in the interior 303 of the IGU 302. Once an IGU 302 is determined to not have a failure in the hermetic seal, the gas portion will then (e.g., immediately after) provide a pressure of gas (e.g., supply a gas) into the interior of the IGU 302. Because the ambient atmosphere has been removed from the interior of the IGU 302, the time it takes to fill the interior 303 with gas is decreased. In circumstances in which the IGU 302 has already been assembled, the pressure portion 306 and the gas portion 304 may be used separate from the assembly process to test the IGU for any failures to the hermetic seal and to fill the IGU 302 with a pressure of gas.

Referring again to FIG. 3, during operation, an IGU 302 is in fluid communication with the pressure portion 306. The type of IGU 302 is determined, and the pressure pump 322 is used to create a desired pressure in the interior 303 of the IGU 302. The pressure in the interior 303 of the IGU 302 is monitored to determine whether or not the IGU 302 has a failure in the hermetic seal. A seal failure is detected if the IGU 302 does not reach the desired pressure in a first specified duration of time. The desired pressure and first specified duration of time may depend on the type of IGU 302 and may be determined, for example, as described herein with reference to system 200 (FIG. 2). Once the desired pressure is created in the IGU 302, if the difference between the monitored pressure and the desired pressure is equal to a failure point within a second specified duration of time, the IGU 302 may be determined to have a failure in the hermetic seal. The failure point and the second specified duration of time may be determined, for example, as described herein with reference to system 200.

The system 300 of the present application may be used to determine whether a leak exists in the sealant, such as, for example, a void in the sealant. In certain situations, the glass lites may break prior to the expiration of the first and/or second specified durations of time. In these situations, the IGU 302 may be determined to have had a stress crack in the glass lites. If the first and second specified durations of time expire, and a failure due to pressure fluctuations (as described above) has not been detected, and the glass lites did not break, the IGU 302 may be determined to not have a failure in the hermetic seal. In situations in which the IGU 302 is determined to not have a failure in the hermetic seal, the gas portion 304 may be used to supply a gas into an interior 303 of the IGU 302. The gas may be, for example, any gas generally used with an IGU. The gas source (e.g., pump) 312 is in fluid communication with the interior 303 of the IGU 302 via the connection between the gas line 318 and the port 310. The pressure of gas placed in the IGU 302 may depend upon the type of IGU 302. For example, the applied pressure of the gas may be between about 0 KPa and about 6 KPa, such as between about 0.125 KPa and about 6 KPa, such as between about 0.125 KPa and about 0.5 KPa. The pressure applied to the IGU 302 is not necessarily indicative of the final pressure of the IGU when installed. The final operating pressure of the IGU 302 may be determined by the manufacturer and may depend upon design intent. For example, an IGU 302 manufactured at a low elevation, but installed at a higher elevation, may require the IGU to be manufactured with a negative pressure. Once the desired amount of gas is placed in the IGU 302, and the gas portion 304 and the pressure portion 306 are disconnected from the port 310, a final hermetic seal is made to the IGU 302, and the IGU 302 is in condition for installation.

Figure 4:
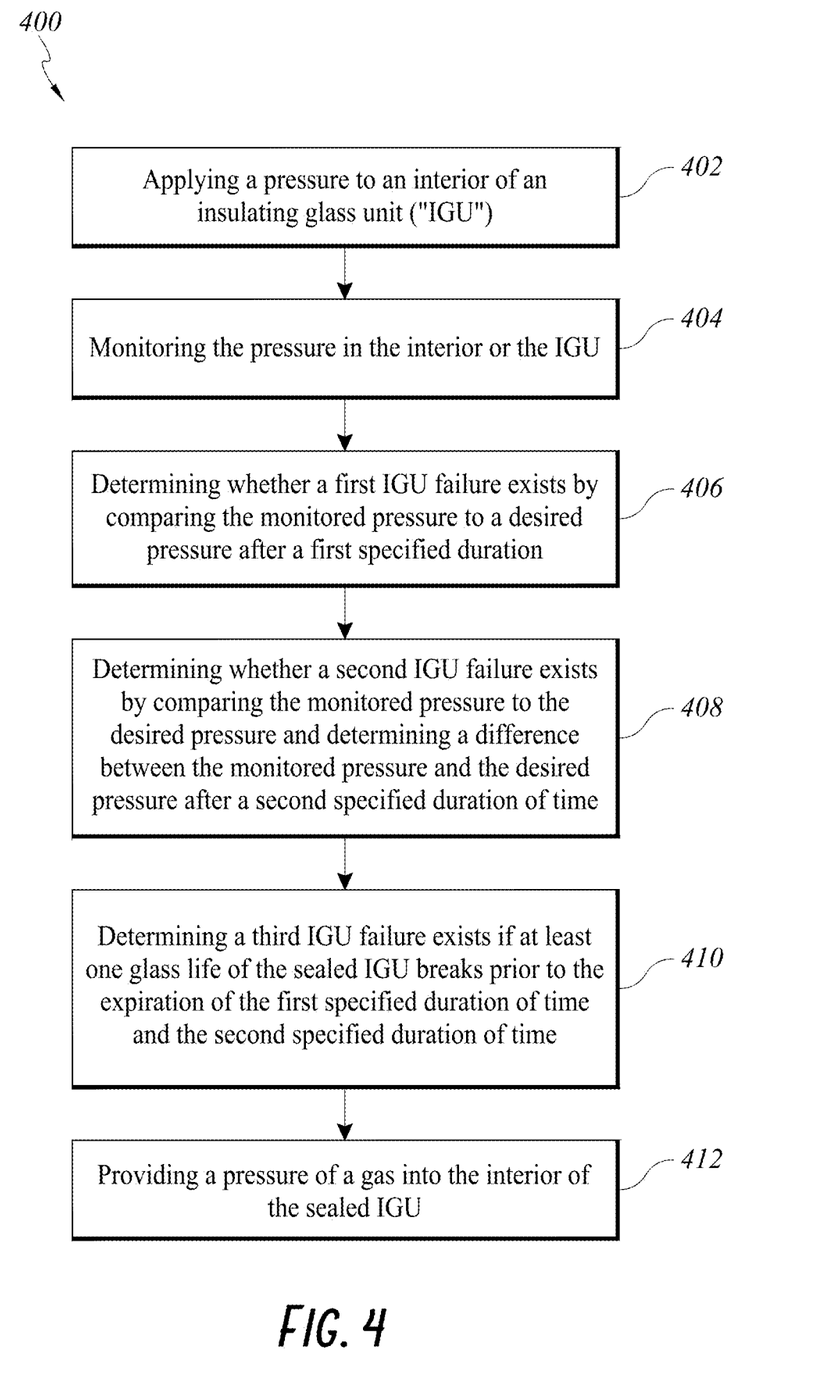
FIG. 4 is a block diagram that illustrates a method for detecting a failure in an insulating glass unit according to an embodiment of the present application.

Referring to FIG. 4, a method 400 for inspecting a sealed IGU for a seal failure includes applying a pressure to an interior of a sealed IGU (shown at 402). The desired applied pressure is optionally dependent upon the type of IGU. The method 400 further includes monitoring the pressure in the interior of the IGU (shown at 404). In addition, the method 400 includes determining whether a first IGU failure exists by comparing the monitored pressure to a desired pressure after a first specified duration of time (shown at 406). The first IGU failure exists if the monitored pressure is less than the desired pressure after the first specified duration of time. The method 400 optionally includes determining whether a second IGU failure exists by comparing the monitored pressure to the desired pressure in order to determine a difference between the monitored pressure and the desired pressure after a second specified duration of time (shown at 408). The second IGU failure exists if the difference between the monitored pressure and the desired pressure is greater than a specified failure point. The method optionally or alternatively includes determining a third failure exists if at least one glass lite of the sealed IGU breaks prior to expiration of the first specified duration of time and/or the second specified duration of time (shown at 410). In addition, the method 400 includes providing a pressure of a gas (e.g., supplying a gas) into the interior of the sealed IGU (shown at 412). The pressure of gas is provided into the interior of the sealed IGU if it is determined that the first, second, and third IGU failures do not exist.

According to an embodiment, the methods and inspection/testing techniques described herein, for example performed by the control portion or controller 308, may be implemented by one or more special-purpose computing devices. The special-purpose computing devices may optionally be hard-wired to perform the techniques, or may include digital electronic devices such as one or more application-specific integrated circuits (ASICs) or field programmable gate arrays (FPGAs) that are persistently programmed to perform the methods or techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices (e.g., tablet computers, mobile phones), networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
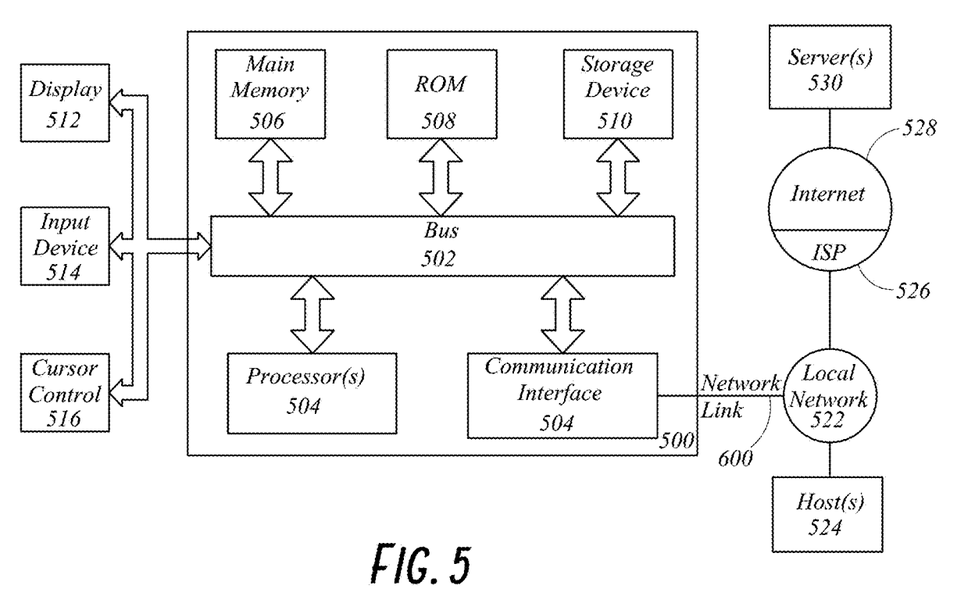
FIG. 5 shows a block diagram of a computer system with which certain systems and methods discussed herein may be implemented.

For example, FIG. 5 is a block diagram that illustrates an embodiment of a computer system 500 upon which the various IGU testing/inspection methods or techniques discussed herein may be implemented.

Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further may include a read only memory (ROM) 508 or other static storage device coupled to bus 502 for storing static information and instructions for processor 504. A storage device 510, such as a magnetic disk, optical disk, or USB thumb drive (Flash drive), and/or any other suitable data store, is provided and coupled to bus 502 for storing information and instructions, such as sensor data, control instructions (e.g., for the valve that regulates pressure to be applied to IGU), and/or the like.

Computer system 500 may be coupled via bus 502 to a display 512. The display 512 can be one of the displays discussed above (e.g., in a video recorder, mobile phone, tablet computer, laptop computer, television, etc.) for displaying information to a user and/or receiving input from the user. An input device 514, which may include alphanumeric and other keys (e.g., in a remote control), is optionally coupled to bus 502 for communicating information and command selections to processor 504. Another type of user input device is cursor control 516, such as a mouse, a trackball, cursor direction keys, or otherwise a cursor for communicating direction information and command selections to processor 504 and for controlling cursor movement on the display 512. This input device typically has at least two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 500 may include a user interface module, and/or various other types of modules to implement one or more graphical user interface of the data analysis system. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. Generally, the modules described herein refer to logical modules that may be combined with other modules or divided into sub-modules despite their physical organization or storage. In various embodiments, aspects of the methods and systems described herein may be implemented by one or more hardware devices, for example, as logic circuits. In various embodiments, some aspects of the methods and systems described herein may be implemented as software instructions, while other may be implemented in hardware, in any combination.

As mentioned, computer system 500 may implement the methods or techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more modules and/or instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions and/or modules into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

In some embodiments, Computer system 500 may also include a communication interface 518 coupled to bus 502. Communication interface 518 provides a two-way data communication coupling to a network link 600 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information. For example, the communication interface 518 can allow the computer system 500 to communicate with the database 338 and/or scanner 340.

Network link 600 typically provides data communication through one or more networks to other data devices. For example, network link 600 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 600 and through communication interface 518, which carry the digital data to and from computer system 500, are example forms of transmission media.

Computer system 500 can send messages and receive data, including program code, through the network(s), network link 600 and communication interface 518. In the Internet example, a server 530 might transmit a requested code for an application program through Internet 528, ISP 526, local network 522 and communication interface 518. For example, in an embodiment various aspects of the data analysis system may be implemented on one or more of the servers 530 and may be transmitted to and from the computer system 500. For example, data may be transmitted between computer system 500 and one or more servers 530 (e.g., on which the database 338 may reside). In an example, IGU specification data may be transmitted from a database on the one or more servers 530 to the computer system 500, and analysis data (e.g., test result data) may then be transmitted back to the servers 530 (e.g., to one or more databases on the servers).

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and lites, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel"

refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the invention need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed containers.

What is claimed is:

1. A method for inspecting an insulating glass unit ("IGU") seal integrity prior to filling the IGU with a gas and sealing the IGU, the method comprising:
   applying, using a pressure source device, a first pressure amount to an interior space between a pair of glass lites of the IGU prior to filling the IGU with a gas;
   monitoring, using a computing device, the pressure in the interior space of the IGU;
   comparing, using the computing device, the monitored pressure to the first pressure amount after a first specified duration of time to determine if the monitored pressure has reached the first pressure amount, determining using the computing device that a first failure condition exists if the monitored pressure does not reach the first pressure amount in said first specified duration of time, and determining using the computing device that the first failure condition does not exist if the monitored pressure reaches the first pressure amount in said first specified duration of time;
   maintaining the application of the first pressure amount to the interior space between a pair of glass lites of the IGU over a second specified duration of time once the monitored pressure reaches the first pressure amount after the first specified duration of time and the computing device has determined the first failure condition does not exist;
   comparing during the second specified duration of time, using the computing device, the monitored pressure to the first pressure amount to determine if after the second specified duration of time the monitored pressure differs from the first pressure amount, determining using the computing device that a second failure condition different than the first failure condition exists if the monitored pressure differs from the first pressure amount after said second specified duration of time, and determining using the computing device that the second failure condition does not exist if the monitored pressure does not differ from the first pressure amount after said second specified duration of time;
   filling the IGU with the gas if the computing device determines that the first and second failure conditions do not exist; and
   generating, using the computing device, one or both of a visual alert and an audible alert in response to determining that one or both of the first failure condition and second failure condition exists.

2. The method of claim 1, wherein determining using the computing device that a second failure condition exists includes determining that the monitored pressure differs from the first pressure amount by an amount greater than a predetermined amount after the second specified duration of time.

3. The method of claim 2, further comprising monitoring the glass lites during the first and second specified durations of time, wherein a third failure condition exists if at least one of the glass lites breaks prior to expiration of the first specified duration of time and the second specified duration of time.

4. The method of claim 3, wherein filling the IGU with the gas comprises supplying, using a gas supply source, a gas to the interior space of the sealed IGU following determination that the first failure condition, second failure condition and third failure condition do not exist.

5. The method of claim 2, wherein the predetermined amount is determined using the computing device based on one or both of properties of the IGU and pressure fluctuations that the IGU will experience during operation.

6. The method of claim 2, wherein the predetermined amount is between about −1 KPa and about 1 KPa.

7. The method of claim 2, wherein the second specified duration of time is between about 1 second and about 120 seconds.

8. The method of claim 1, wherein the first pressure amount applied to the interior space of the IGU is between about −6 KPa and about 6 KPa.

9. The method of claim 1, wherein the first specified duration of time is between about 1 second and about 600 seconds.

10. The method of claim 1, wherein the pressure source device comprises a pump in fluid communication with the interior of the IGU via a port of the IGU.

11. The method of claim 1, wherein the computing device comprises a microprocessor and comparing the monitored pressure with the desired pressure is performed by the microprocessor.

12. The method of claim 1, wherein applying the first pressure amount includes applying a vacuum to the interior space of the IGU.

13. The method of claim 1, wherein applying the first pressure amount with the pressure source includes repeatedly cycling the first pressure amount on and off over a predetermined number of cycles to the interior space of the IGU.

14. A system for inspecting an insulating glass unit ("IGU") seal integrity prior to filling the IGU with a gas and sealing the IGU, the system comprising:

a pressure test assembly releasably coupleable to an insulating glass unit, the pressure test assembly comprising
a pressure source;
a flow path extending between a proximal end in communication with the pressure source and a distal end releasably coupleable to the IGU to place the pressure source in fluid communication with an interior space of the IGU defined between a pair of glass lites of the IGU; and
a pressure sensor disposed in communication with the interior space of the IGU and configured to measure a pressure in the interior of the IGU, and
a controller comprising a microprocessor, the controller configured to communicate with the pressure sensor, wherein the pressure test assembly is operable to:
apply a first pressure amount to an interior space between a pair of glass lites of the IGU prior to filling the IGU with a gas;
monitor, via the controller, the pressure in the interior space of the IGU;
compare, via the controller, the monitored pressure to the first pressure amount after a first specified duration of time to determine if the monitored pressure has reached the first pressure amount, determining via the controller that a first failure condition exists if the monitored pressure does not reach the first pressure amount in said first specified duration of time, and determining via the controller that the first failure condition does not exist if the monitored pressure reaches the first pressure amount in said first specified duration of time;
maintain the application of the first pressure amount to the interior space between a pair of glass lites of the IGU over a second specified duration of time once the monitored pressure reaches the first pressure amount after the first specified duration of time and the controller has determined the first failure condition does not exist;
compare during the second specified duration of time, via the controller, the monitored pressure to the first pressure amount to determine if after the second specified duration of time the monitored pressure differs from the first pressure amount, determining via the controller that a second failure condition different than the first failure condition exists if the monitored pressure differs from the first pressure amount after said second specified duration of time, and determining via the controller that the second failure condition does not exist if the monitored pressure does not differ from the first pressure amount after said second specified duration of time; and
generate, via the controller, one or both of a visual alert and an audible alert in response to determining that one or both of the first failure condition and second failure condition exists.

15. The system of claim 14, wherein the pressure source is a vacuum pump operable to apply a vacuum to the interior space of the IGU.

16. The system of claim 14, wherein the flow path is defined by one or more conduits.

17. The system of claim 16, wherein the pressure sensor is disposed on the one or more conduits.

18. The system of claim 14, wherein the distal end of the flow path is releasably coupleable to a connector of the IGU.

19. The system of claim 14, wherein the pressure sensor is removably coupleable to a second port of the IGU.

20. The system of claim 14, wherein one or both of the first and second failure conditions comprises a leak in a hermetic seal of the IGU.

21. The system of claim 14, further comprising a gas supply assembly releasably coupleable to the IGU, wherein the gas portion includes:
a gas supply source;
a flow path extending between a proximal end in communication with the gas supply source and a distal end releasably coupleable to a connector of the IGU to place the gas supply source in fluid communication with the interior space of the IGU, the controller configured to operate the gas supply assembly to fill the IGU with a gas once the controller determines the first and second failure conditions do not exist.

* * * * *

UNITED STATES PATENT AND TRADEMARK OFFICE
CERTIFICATE OF CORRECTION

PATENT NO. : 10,564,063 B2
APPLICATION NO. : 15/801603
DATED : February 18, 2020
INVENTOR(S) : Christian Aaron Cirino Page 1 of 1

It is certified that error appears in the above-identified patent and that said Letters Patent is hereby corrected as shown below:

In the Claims

In Column 20, Line 32, Claim 4, before "IGU" delete "sealed".

Signed and Sealed this
Twenty-sixth Day of May, 2020

Andrei Iancu
*Director of the United States Patent and Trademark Office*